J. HOFFMAN,

Assignor to J. RECKENDORFER.

LEAD AND CRAYON HOLDER.

No. 9,902. Reissued Oct. 18, 1881.

Witnesses.
Robert Everett.
Geo. J. Dick

Inventor.
Joseph Hoffman
by W. Bailey
his Atty.

N. PETERS, Photo-Lithographer, Washington, D. C.

UNITED STATES PATENT OFFICE.

JOSEPH HOFFMAN, OF NEW YORK, N. Y., ASSIGNOR TO JOSEPH RECKENDORFER, OF SAME PLACE.

LEAD AND CRAYON HOLDER.

SPECIFICATION forming part of Reissued Letters Patent No. 9,902, dated October 18, 1881.

Original No. 223,512, dated January 13, 1880. Application for reissue filed March 2, 1881.

*To all whom it may concern:*

Be it known that I, JOSEPH HOFFMAN, of the city, county, and State of New York, have invented certain new and useful Improvements in Pencil or Lead and Crayon Holders, of which the following is a specification.

My invention consists in combining, with a tubular lead-receiving case or handle, lead-holding spring-closed pivoted or hinged levers, which normally close together, so as to grasp the lead or other article placed between their jaws or clamping ends, the said levers being actuated to open (against the stress of the closing spring or springs) by suitable instrumentalities arranged to be operated by hand.

Various instrumentalities can be used to effect the opening of the jaws or clamping ends against the stress of the closing-spring. One way of effecting the result is to project the rear ends of the levers laterally from the case or handle in such position that they may be pressed by hand, their arrangement being such that when pressed laterally they will release the hold of the jaws on the lead. It is this arrangement which is represented in the accompanying drawings, to which I will now refer.

Figure 1:
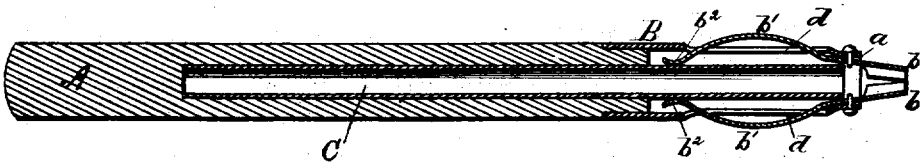
Figure 2:
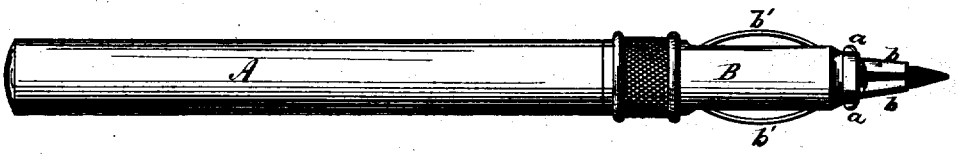

Figure 1 represents a longitudinal central section of a lead or crayon holder embodying my invention in its preferred form. Fig. 2 is a side elevation of the same.

A is the tubular case or handle, which, when made of wood, may terminate, as shown, in a metal sleeve or tube, B, attached to the handle, and provided with a contracted front end, in which are held the pivots *a* of the two jaws *b*. These jaws are perforated at proper points to receive the pivot-pins *a*, and have their acting ends, in this instance, projecting beyond the nose or front end of the sleeve B. The metal inner lead-receiving tube, C, extends forward about as far as the pivots *a*. The jaws are prolonged in rear of their pivots, these prolonged ends forming arms *b'*, which are bowed, as shown, to constitute springs, (they are made of spring metal—such as steel, for instance,) the rear ends, $b^2$, of which bear on the central tube, C, and by their pressure thereon tend to cause the jaws to close together. The bowed parts of the springs project through slots *d* in the sheath or sleeve B, as shown, and are in position to be operated on by hand.

In order to open the jaws the bowed springs are pressed together between the thumb and finger, their rear ends sliding on tube C, the result of the movement being that the jaws *b* will be caused to separate, and thus release their grasp on the lead. The moment pressure is released from the springs they will expand, and in so doing will again close the jaws. Each part *b b'* is thus a pivoted spring-lever, whose jaw end is removed from the lead by lateral pressure on that part of the lever back of its pivot or hinge.

I have described one way of accomplishing the result I have in view. It is manifest, however, that the same result may be attained in other ways. The arms *b'*, for instance, need not be springs, but may rest on or be acted on by springs, which will tend to cause them to move apart, thus closing the jaws in front. So, too, the arms need not project through the case, but may be acted on against the stress of the jaw-closing springs by a compressing device, such as a movable conical sleeve adapted to slide on and compress them together, and operated to so move by a sleeve or other device on the exterior of the sheath with which it may be united. I do not restrict myself, therefore, to the particular construction herein shown in illustration of my invention; but

What I claim, and desire to secure by Letters Patent, is—

1. In a lead or crayon holder, as an integral part of the lead clamping or grasping device, a spring clamp or lever pivoted or hinged to the tubular sheath or handle, and constructed, substantially as described, so that its clamping end will be removed from the lead by lateral pressure on said lever, substantially as and for the purpose set forth.

2. The combination, with the tubular lead-containing sheath or handle, of pivoted spring clamps or levers constructed, substantially as described, so that their clamping ends will be removed from the lead by lateral pressure on said levers, substantially as and for the purpose set forth.

3. In a lead or crayon holder, the combination, with the tubular lead-containing sheath or handle, of lead-grasping spring-levers pivoted or hinged to the front portion or tip of said sheath, with their arms back of the pivot or hinge projecting laterally from the sheath, and arranged to work in slots therein, substantially as set forth, so that the lead-grasping ends of said levers may be removed from the lead by lateral pressure on said projecting arms against the stress of their springs.

4. In a pencil or lead and crayon holder, the combination, with the tubular case or sheath, of hinged or pivoted spring-closed jaws for grasping the lead, and means for opening said jaws against the spring-pressure, substantially as set forth.

5. The combination, substantially as hereinbefore set forth, of the case or handle, the central lead-receiving tube, and the lead-holding jaws, provided with spring-arms projecting through the case in position to be acted on by hand to effect the opening of the jaws.

In testimony whereof I have hereunto set my hand this 26th day of February, 1881.

JOSEPH HOFFMAN.

Witnesses:

L. ANSBACHER,

JOE W. SWAINE.